United States Patent [19]
Scott

[11] Patent Number: 5,961,677
[45] Date of Patent: Oct. 5, 1999

[54] VACUUM CLEANER EXHAUST FILTER

[75] Inventor: Robin P. Scott, Anaheim, Calif.

[73] Assignee: Quality Products, Inc., Tokyo, Japan

[21] Appl. No.: 09/045,767

[22] Filed: Mar. 20, 1998

[51] Int. Cl.[6] .................................................. B01D 50/00
[52] U.S. Cl. ............................ 55/385.1; 55/413; 55/418; 55/419; 55/DIG. 3; 55/DIG. 34; 15/339
[58] Field of Search ................... 55/385.1, 385.4, 55/413, 418, 419, 490, DIG. 3, DIG. 30, DIG. 34; 15/339

[56] References Cited

U.S. PATENT DOCUMENTS

| D. 296,945 | 7/1988 | Erickson, Jr. . |
|---|---|---|
| 914,863 | 3/1909 | McKendrick . |
| 1,878,052 | 9/1932 | Wilson et al. . |
| 2,102,353 | 12/1937 | Brock . |
| 2,221,572 | 11/1940 | Brock et al. . |
| 2,226,045 | 12/1940 | Baldwin . |
| 2,945,553 | 7/1960 | Brock . |
| 3,269,097 | 8/1966 | German . |
| 4,330,900 | 5/1982 | Dorr et al. . |
| 4,488,883 | 12/1984 | Philp . |
| 4,640,697 | 2/1987 | Erickson, Jr. . |
| 4,673,422 | 6/1987 | Tidwell . |
| 5,783,086 | 7/1998 | Scanlon et al. . |

*Primary Examiner*—Jay H. Woo
*Assistant Examiner*—Fred Prince
*Attorney, Agent, or Firm*—James G. O'Neill

[57] ABSTRACT

An exhaust filter for insertion into an exhaust port of a liquid bath vacuum cleaner has an elongated, tubular inlet secured to a lower housing, which lower housing is secured within an upper housing. The upper end of the tubular inlet extends into the upper housing and is provided with a flat top portion and a series of openings between angled vanes so as to direct air flow entering the tubular inlet evenly around the circumference of the angle vanes and through a HEPA filter sealingly secured between the lower and upper housings. Air flows through the HEPA air filter and out slotted openings in opposed ends of the exhaust filter. The flow of air at one end passes by a rotary blade having an indicator element thereon, which indicates the condition of the HEPA filter, and when the exhaust filter must be replaced.

20 Claims, 4 Drawing Sheets

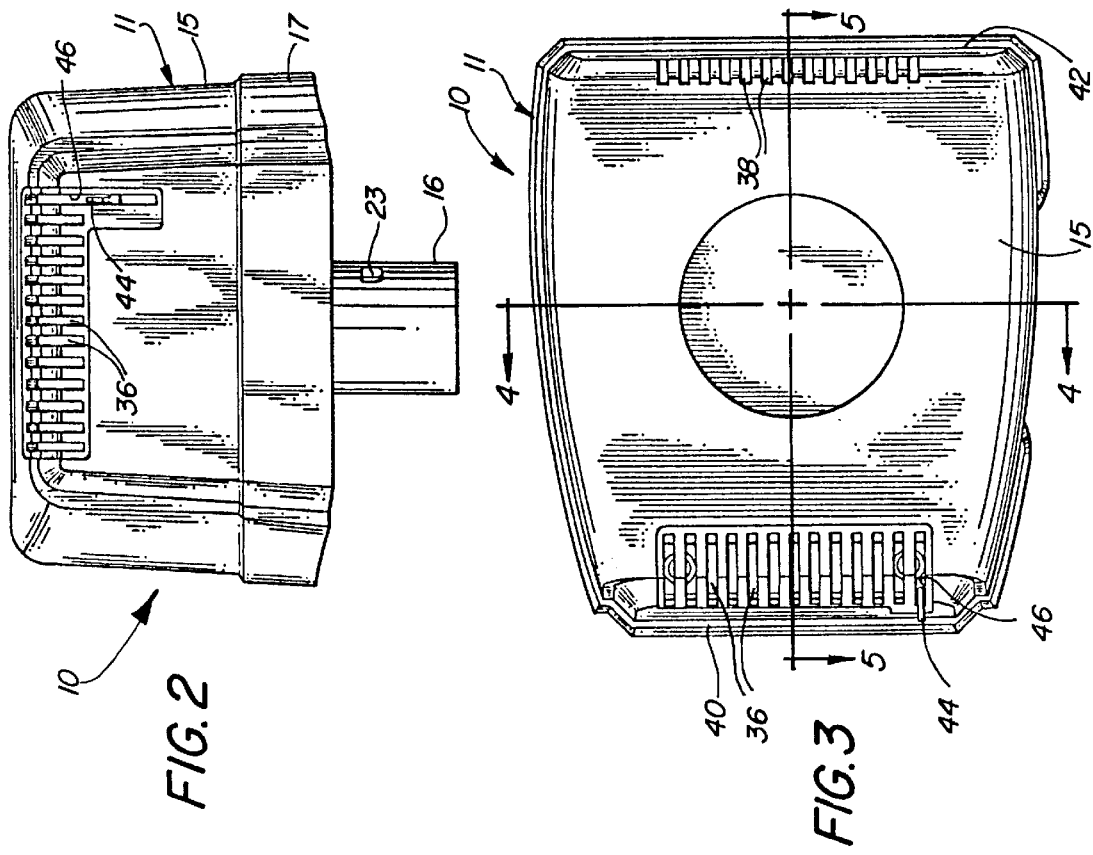
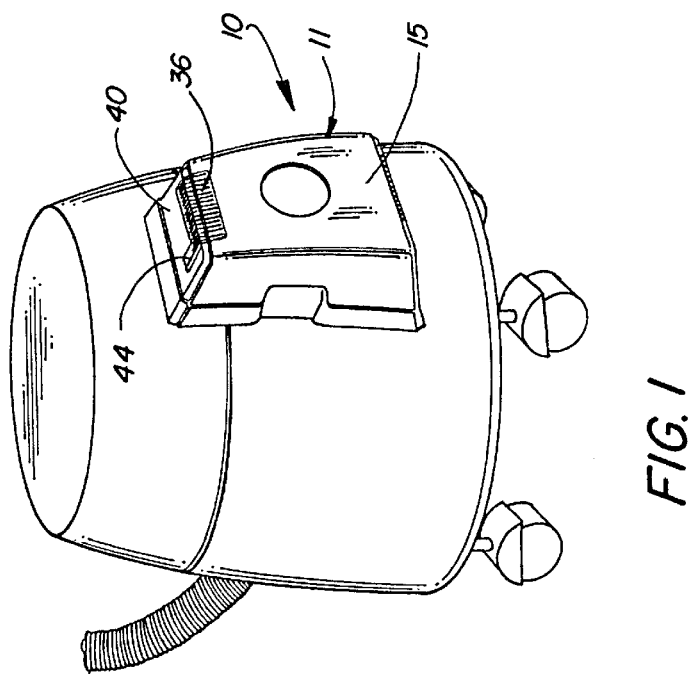

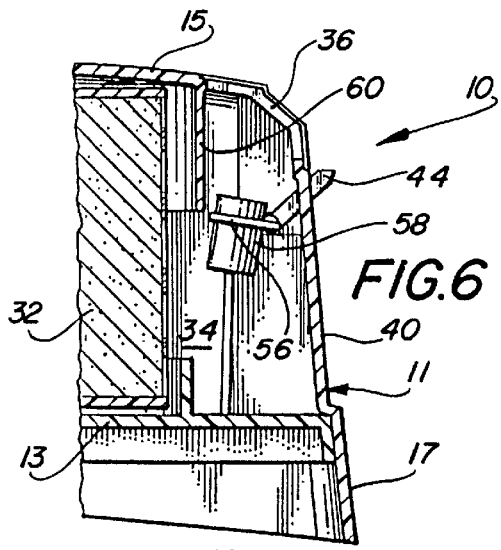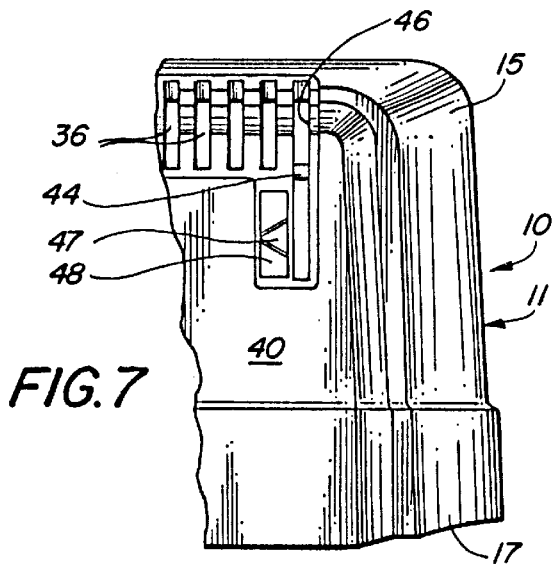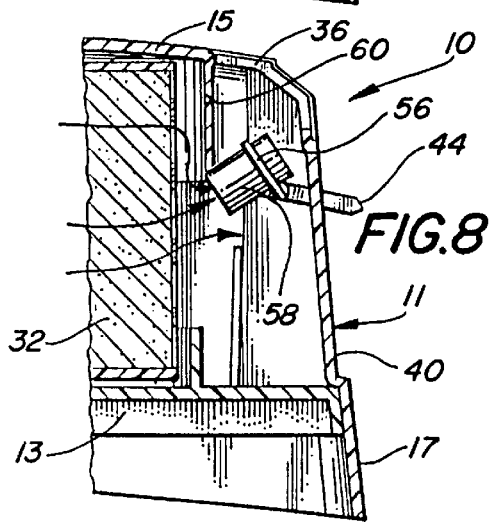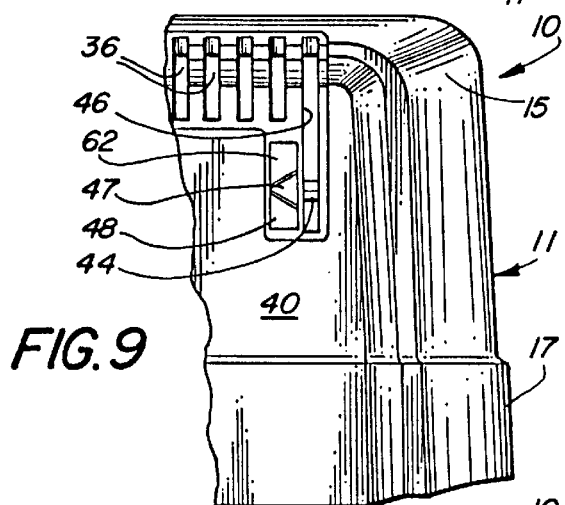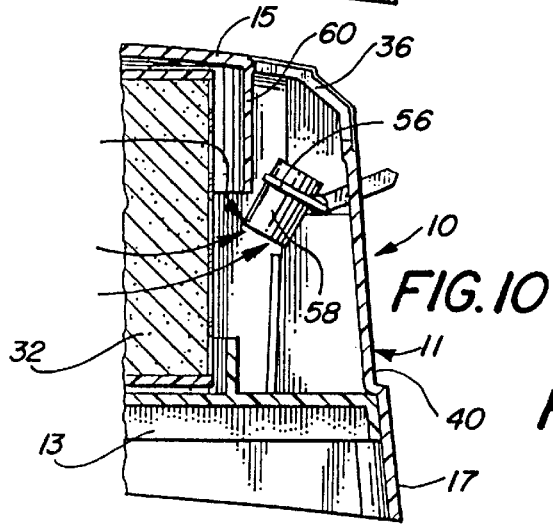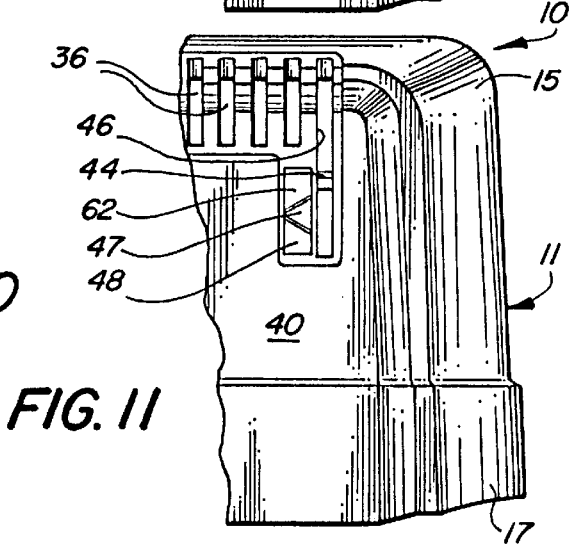

FIG. 12
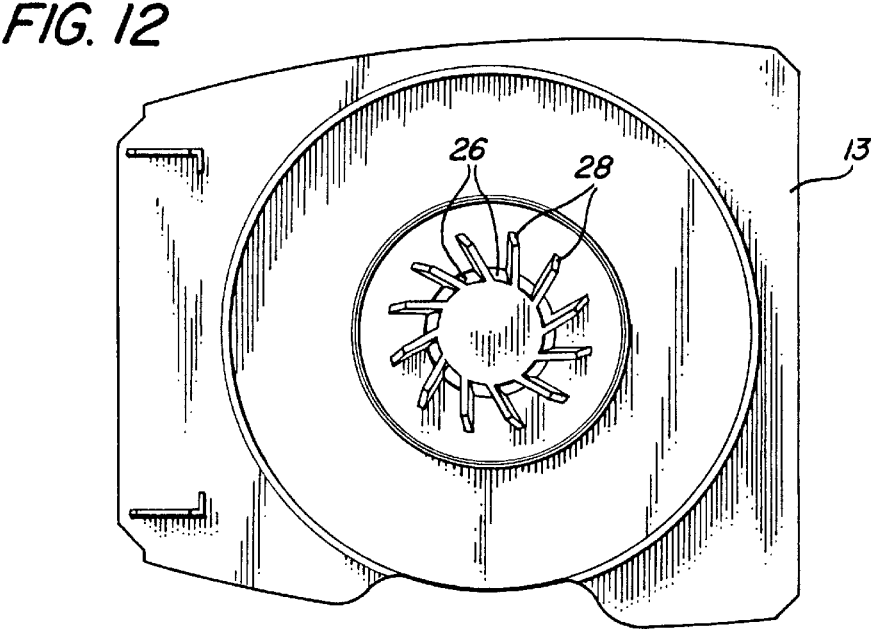
FIG. 13
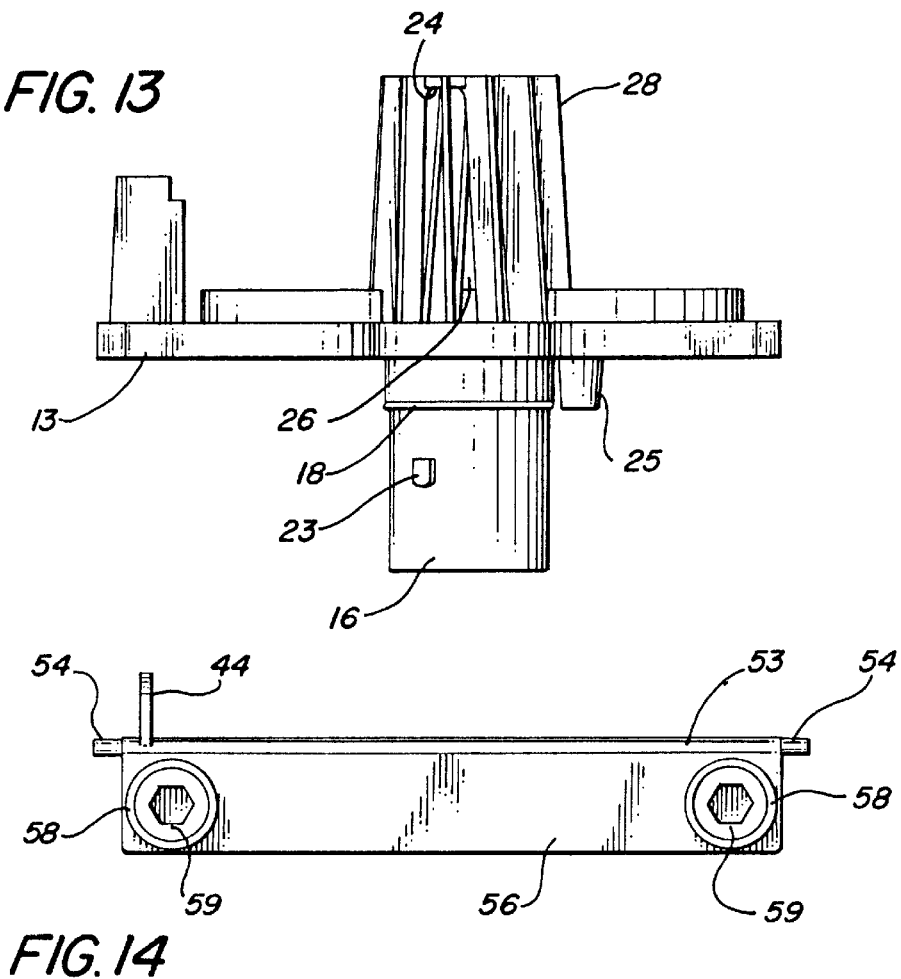
FIG. 14

5,961,677

VACUUM CLEANER EXHAUST FILTER

BACKGROUND OF THE INVENTION

1. Field of the Invention

This invention relates generally to a system for removing dust and other foreign particles from air and, more particularly, to an improved filter for a vacuum cleaner exhaust, to remove particles exhausted by the vacuum cleaner.

2. Description of Related Art

Many types of vacuum cleaners are known, including those referred to as liquid bath cleaners having water contained in a lower reservoir through which air is drawn, before being exhausted from the vacuum cleaner. Examples of prior art showing such liquid bath vacuum cleaners are U.S. design Pat. No. 296,945 to Erickson, Jr., and U.S. Pat. Nos. 2,102,353 to Brock, 2,221,572 to Brock et al., 2,945,553 to Brock, 4,640,697 to Erickson, Jr. and 4,673,422 to Tidwell.

In the known liquid bath vacuum cleaners, a separator is usually mounted above a bath of liquid held in a reservoir and air within a room is drawn into the vacuum cleaner by a tool and hose. The air then passes through the water, through the separator, and is discharged back into the room via a single exhaust, or a multiple of outlets formed in the body of the vacuum cleaner. When passing through the vacuum, the air is basically treated to remove solids, and to humidify or otherwise treat the air. A germicidal solution may be added to the water so as to further treat the air to destroy germs carried therein. However, because of the size and tenacity of some viruses, bacteria, and the like, not all airborne substances are removed or killed when passing through the water bath and any germicidal solution held therein. Therefore, microscopic particles, bacteria, or viruses may be redistributed back into the air in an area being vacuumed.

Air line filters, such as that disclosed in U.S. Pat. No. 3,269,097, are known. However, such air line filters require that an inlet line be brought to one side of the filter, whereby air will pass through a filter element held in a housing and then pass out an exhaust port to a separate line. Such air line filters, however, cannot be adapted to be used in the exhaust of a vacuum cleaner, and particularly, a liquid bath vacuum cleaner, so as to filter out substantially all remaining microscopic particles, or the like, not filtered out by the passage of air through the vacuum cleaner, before the air is exhausted back into a room.

The present invention solves the problem of filtering microscopic particles, including bacteria and viruses in air exhausted from a liquid bath vacuum cleaner, for added safety and health purposes. The present invention provides an improved filter for insertion into the exhaust port of a liquid bath vacuum cleaner to filter out substantially all remaining microscopic particles from air being exhausted from such a vacuum cleaner.

Accordingly, it is a general object of the present invention to provide an improved air filter. It is a more particular object of the present invention to provide an improved air filter for a vacuum cleaner. It is a further particular object of the present invention to provide an improved air filter adapted to be attached to an exhaust port of a vacuum cleaner. It is a still further object of the present invention to provide an improved vacuum cleaner exhaust filter for a liquid bath vacuum cleaner. It is yet a further particular object of the present invention to provide an improved vacuum cleaner exhaust filter having angled vanes therein for more evenly distributing the flow of exhaust air through an internal filter means. It is a still further particular object of the present invention to provide an improved vacuum cleaner exhaust filter having a housing with novel air directing means in the interior of the housing, and an indicator to show the condition of the filter held within the housing.

In accordance with one embodiment of the present invention, a vacuum cleaner exhaust filter is adapted to be inserted and held in an exhaust port of a liquid bath vacuum cleaner. Air exhausted from the vacuum cleaner passes through the exhaust port of the vacuum cleaner into an inlet passageway of a filter housing, and is directed by a series of vanes through a HEPA filter securely held within the housing, for passage through openings in the filter housing to a space being cleaned. An indicating means is mounted within the filter housing and controlled by the flow of air exiting therefrom, to indicate the condition of the filter.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a perspective view of a known liquid bath vacuum cleaner having an exhaust filter of the present invention secured in the exhaust outlet thereof;

FIG. 2 is a top plan view of a preferred embodiment of the vacuum cleaner exhaust filter of the present invention, as shown mounted on the vacuum cleaner of FIG. 1;

FIG. 3 is a front elevational view of the exhaust filter shown in FIG. 1, turned 90°;

FIG. 6 is a partial cross-sectional view of the right end of the filter housing shown in FIG. 5, with an indicating finger in "off" position;

FIG. 7 is a right end view of the partial cross-sectional view shown in FIG. 6;

FIG. 8 is a partial cross-sectional view similar to that shown in FIG. 6 with the indicating vane in the full air flow position of a clean filter;

FIG. 9 is a right end view of FIG. 8;

FIG. 10 is a partial cross-sectional view similar to that of FIG. 8, with the indicating finger shown in a blocked or dirty filter position;

FIG. 11 is a right end view of FIG. 10;

FIG. 12 is a top plan view of the lower housing showing an internal flow control vane system secured thereto, and extending into a central area of a HEPA filter;

FIG. 13 is a side elevational view of the lower housing and internal flow control valve system; and FIG. 14 is a top plan view of the indicating vane and control blade held within the housing of the exhaust filter of the present invention.

DETAILED DESCRIPTION OF THE PREFERRED EMBODIMENT

Figure 4:
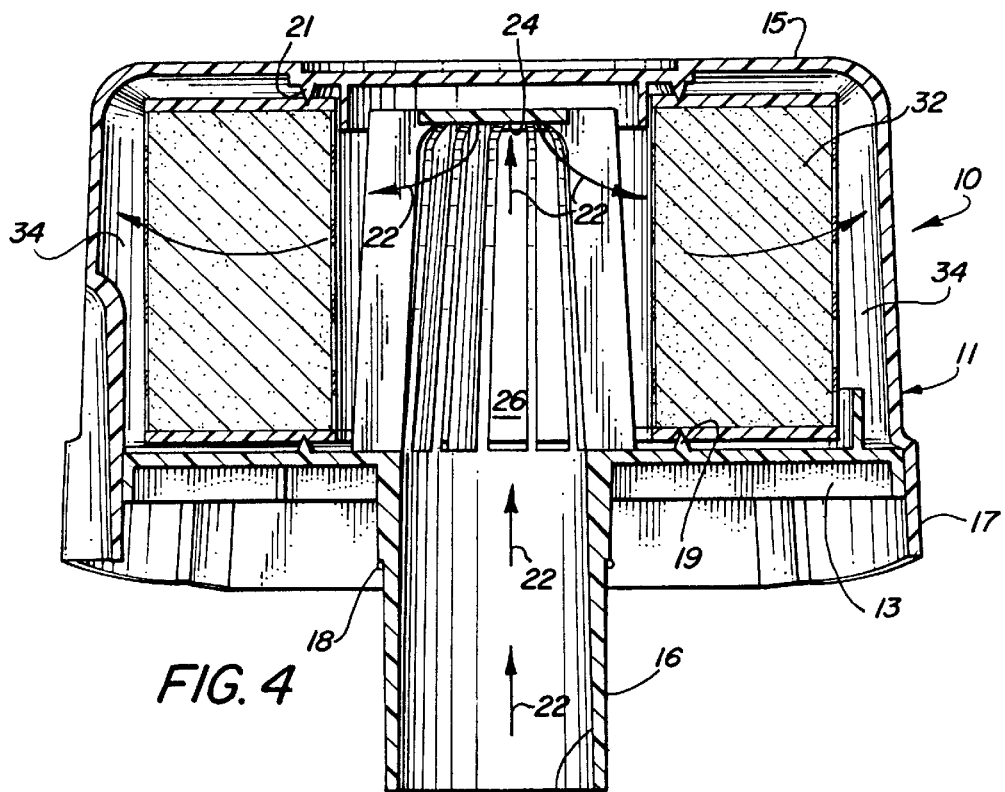
FIG. 4 is a cross-sectional view across the width of the exhaust filter, taken along line 4—4 of FIG. 3.

The following description is provided to enable any person skilled in the art to make and use the invention, and sets forth the best modes contemplated by the inventor of carrying out his invention. Various modifications, however, will remain readily apparent to those skilled in the art, since the generic principles of the present invention have been defined herein, specifically to provide for a novel and improved vacuum cleaner exhaust filter 10.

Turning now to the drawings, there shown in FIG. 1 is an exhaust filter 10 of the present invention, mounted on the exhaust opening of a liquid bath vacuum cleaner 12. As is well known, the exhaust opening of a vacuum cleaner such as shown at 12, is located 180° away, on the opposite side of the vacuum cleaner from the inlet opening to which an inlet hose 14 is secured. The inlet hose 14 is attached to a power nozzle or other cleaning nozzle accessory to enable vacuumed, dirty air to be drawn into the interior of the vacuum cleaner, where the air passes through a liquid bath in a reservoir held in the base thereof, and then passes through a separator and other internal operating components, to eventually be blown out the exhaust opening of the vacuum. The vacuum cleaner exhaust filter 10 of the present invention includes a downwardly extending, tubular inlet element 16 formed in a lower housing portion 13 of a housing 11. The inlet element 16 includes bayonet connections 23 thereon, and is sized and dimensioned so as to fit snugly in and to be sealingly held in the exhaust opening of the vacuum cleaner 12. An O ring seal, or other sealing means 18 (see FIGS. 4, 5 and 13) may be provided around the tubular inlet 16, on a shoulder portion, so that when the vacuum cleaner filter is inserted into the exhaust outlet of the vacuum with the bayonet connections 23 inserted in tracks, and then rotated clockwise (when looking at FIG. 1) until a blade 25 formed in a lower surface of the lower housing 13 contacts a fuse holder (not shown), and the filter is locked in place. The exhaust filter 10 will then be securely and sealingly held in the exhaust outlet of the vacuum, as shown in FIG. 1.

As shown most clearly in FIG. 4, exhaust air coming from the exhaust outlet enters an internal passageway 20 within the tubular inlet 16. The air then flows up the passageway 20, in the direction of the arrows 22, into an internal flow control means formed at the end of passageway 20, where it either impinges on an inside surface of a substantially flat top portion 24, or flows out through a series of openings 26 formed between angled vanes 28 in the flow control means (see FIGS. 12 and 13). The air then enters internal chamber 30, formed around the flow control means, for passage through a HEPA or other fine filter means 32, to filter out any remaining microscopic particles in the air. The filter means 32 is securely held within the filter housing 11, between separate lower and upper housing portions 13, 15. The lower housing 13 is securely held within a downwardly extending skirt portion 17 of upper housing 15. The housing portions 13, 15 are preferably securely and permanently held together, as by bonding, gluing, sonic welding, or the like. The lower and upper housings 13, 15 may be made from any suitable material, such as a high-impact plastic, or the like, and each have formed therein inner annular sealing elements 19, 21 which cooperate with the lower and upper surfaces of filter means 32 so as to seal the inner chamber 30, and force all air flowing from passageway 20 through openings 26, out through the filter means 32. After exiting through the filter 32, air enters an exit chamber 34 around the filter, and then passes through slotted exit openings 36, 38 formed in opposite ends 40, 42 of the upper housing portion 15.

The first end 40 of the housing, includes a filter condition indicator finger or means 44 extending outwardly through an elongated slot 46. When the filter housing with a clean filter is attached to the vacuum, this filter indicator means 44 should be aligned with a central or green portion 47 of a label 48, secured to the upper housing 15, to indicate proper flow of air through the filter means 32, and out the openings 36 in the end 40, when the vacuum is operating at its maximum setting. The indicator finger 44 is secured to or formed integrally with an element or blade 52, rotatably mounted in a pair of internally slotted or U-shaped openings (not shown), at either end of the slotted exit openings 36 within the interior of the upper housing portion 15. This rotatable element 52 is shown more clearly in FIG. 13. The indicator finger 44 is preferably formed integrally with, or otherwise secured to a substantially cylindrical rod portion 53 having cylindrical ends 54 which are captured and rotatably held in the slotted openings in the interior of the upper housing 15, in a well known manner. The rod 53, is in turn secured to or formed integrally with an elongated blade or fan-type element 56 having openings or cylindrical bosses 58 formed at each end. Weighted elements 59, such as metal plugs, nuts, bolts or screws are held in the bosses 58 so as to assist gravity in keeping the blade 56 and attached indicator means 44 rotated to the substantially upright rest position shown in FIG. 6, when mounted on a vacuum cleaner, as shown in FIG. 1. That is, with no air flowing through the exhaust filter of the present invention, the blade 56 will be in a position adjacent to an inner wall portion 60 extending across an upper portion of the upper housing portion 15. This inner wall 60 acts as an airdam forcing air to flow around the wall and against blade 56, thereby rotating indicator 44, before the air exits through slots 36.

In operation, when the exhaust filter 10 of the present invention is secured in the exhaust opening of vacuum cleaner 12, and the vacuum cleaner is in operation, air flow through the HEPA filter 32, around wall 60, over the blade 56 and out through the slots 36 will cause the blade 56 to rotate to the position shown in FIG. 8, with the indicator 44 pointing to the central or green area 47 of the label 48, as shown in FIGS. 8 and 9. This indicates that the HEPA filter 32 is clean. However, over time, as the HEPA filter 32 becomes blocked by trapped microscopic particles, air flow through the HEPA filter will be reduced, thereby causing the blade 56 to rotate less, thus moving the indicator 44 away from the green central portion 47, and eventually moving to the beginning position 62 shown in FIGS. 6 and 7, preferably marked in red on the label. When the indicator moves to the red position, the entire exhaust filter 10 should be replaced.

Figure 5:
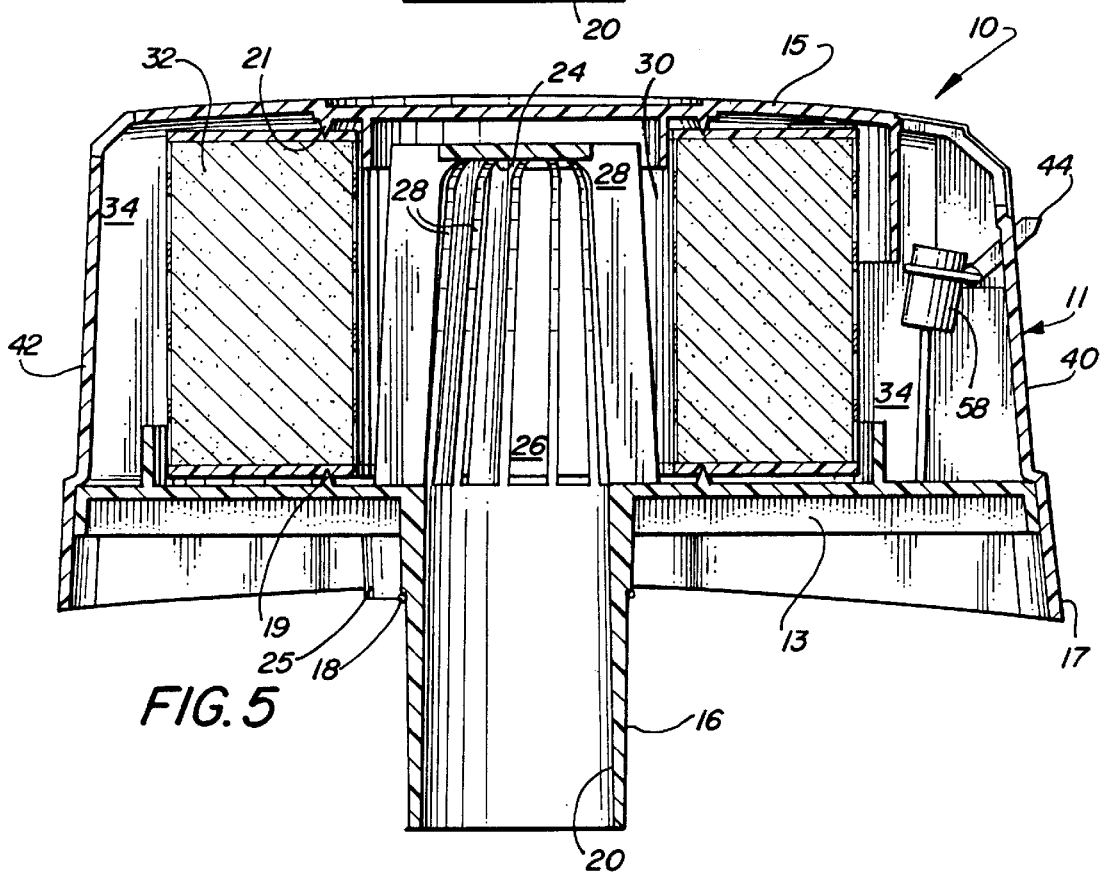
FIG. 5 is a cross-sectional view along the length of the exhaust filter, taken along line 5—5 of FIG. 3.

As best shown in FIGS. 4, 5 and 12, the internal flow control portion, extending centrally upwardly from the lower housing portion 13, extends into open central chamber 30 in the upper housing portion 15 within the filter 32. The end wall 24 and angled vanes 28 formed therein deflect air flowing outwardly through openings 26 so as to more efficiently direct the air flow around the entire inner periphery of filter 32 surrounding the exterior portions of the vanes 28. That is, the end wall 24 and angled vanes 28 more evenly deflect and distribute air throughout the inner area of the filter 32 so as to use the entire filter and to allow flow out both ends 40 and 41 of the upper housing through the slotted exit openings 36, 38.

It, therefore, can be seen that a new and improved exhaust filter for a liquid bath vacuum cleaner is provided by the present invention. The internal flow control portion having the upper flat wall and angled vanes more closely control distribution of the flow of air from the inlet through the HEPA filter, while a rotary blade element having an indicating member thereon indicates the operating status of the HEPA filter and when the filter should be replaced.

Those skilled in the art will appreciate the various adaptations and modifications of the just-described preferred embodiments can be configured without departing from the scope and spirit of the invention. Therefore, it is to be understood that, within the scope of the appended claims, the invention may be practiced other than is specifically described herein.

What is claimed is:

1. An exhaust filter for an exhaust port of a vacuum cleaner, comprising, in combination:

a lower housing;

an upper housing, having a hollow interior;

said lower housing including an inlet port adapted to be connected into the exhaust port of a vacuum cleaner; said inlet port having an internal passageway extending into the hollow interior of the upper housing;

said internal passageway ending in a flow control area having a wall portion and a plurality of side openings;

an air filter held between the lower housing and the upper housing surrounding the plurality of side openings; and exit openings at opposed ends of the upper housing to allow air passing through the air filter to exit the upper housing.

2. The exhaust filter of claim 1, further including an indicating means rotatably secured in a first of the opposed ends of the upper housing, controlled by flow of air exiting the first of the opposed ends.

3. The exhaust filter of claim 2 wherein the plurality of side openings include angled vanes for controlling the direction of flow of air therethrough.

4. The exhaust filter of claim 3 wherein the wall portion is flat.

5. The exhaust filter of claim 4 wherein the indicating means is comprised of a blade and an indicator element rotatably held in the upper housing.

6. The exhaust filter of claim 5 wherein the indicator element is secured at an angle to a rod holding the blade.

7. The exhaust filter of claim 1, further including angled vanes secured to the plurality of side openings; and wherein the wall portion is flat and secured to the angled vanes.

8. The exhaust filter of claim 7, further including rotatable indicating means, comprised of a rod secured to a blade, held in the upper housing; and wherein the rod has an angled indicator element secured thereon.

9. The exhaust filter of claim 8 wherein the rotatable indicating means is held in a first of the opposed ends of the upper housing adjacent an airdam formed in the upper housing.

10. The exhaust filter of claim 9 wherein the exit openings at opposed ends are slotted and the rotatably indicating means includes a finger element held in an elongated slot.

11. An exhaust filter for an exhaust port of a vacuum cleaner, comprising, in combination:

a lower housing having an elongated inlet with an internal passageway formed therein;

an upper housing having a hollow interior secured to the lower housing;

said lower housing elongated inlet adapted to be connected into an exhaust port of a vacuum cleaner; said internal passageway ending in a flow control means held in the hollow interior of the upper housing;

said flow control means comprising a flat upper wall and a plurality of side openings with angled vanes thereon;

a HEPA air filter sealingly held between the lower housing and the upper housing surrounding the flow control means;

a plurality of exit openings at opposed ends of said upper housing to allow air passing through the air filter to exit the upper housing; and an indicating means rotatably held in said upper housing adjacent said plurality of exit openings in one of said opposed ends.

12. The exhaust filter of claim 11 wherein said indicating means includes an indicating finger and a blade controlled by flow of air exiting the plurality of exit openings in said one of said opposed ends.

13. The exhaust filter of claim 12 wherein the indicating finger is formed at an angled and secured to a rod which carries said blade.

14. The exhaust filter of claim 13, further including a label secured to the upper housing adjacent to an elongated slot in which said indicating finger moves.

15. The exhaust filter of claim 14 wherein said plurality of openings at said opposed ends are slots, and said upper housing includes an internal wall formed adjacent said rod and said blade, which internal wall controls flow of air towards said rod and said blade.

16. An exhaust filter for a vacuum cleaner, comprising, in combination:

a vacuum cleaner having an exhaust port;

said exhaust filter having a lower housing and an upper housing secured together to form a hollow interior;

said lower housing including an inlet port connected into said exhaust port; said inlet port having an internal passageway extending into the hollow interior of the upper housing;

said internal passageway ending in a flow control area having a wall portion and a plurality of side openings;

a HEPA filter securely held between said lower housing and said upper housing in said hollow interior surrounding said plurality of side openings;

a plurality of exit openings formed at opposed ends of said upper housing to allow air passing through said HEPA air filter to exit from said upper housing; and a rotary indicating means held in said upper housing adjacent one of said opposed ends.

17. The exhaust filter and vacuum cleaner of claim 16, further including an indicating finger secured to said rotary indicating means in said upper housing.

18. The exhaust filter and vacuum cleaner of claim 17 wherein the plurality of side openings include angled vanes for controlling the direction of flow of air therethrough.

19. The exhaust filter and vacuum cleaner of claim 18 wherein the wall portion is flat, and said indicating means includes a blade secured to a rod.

20. The exhaust filter and vacuum cleaner of claim 19 wherein said indicating finger is secured at an angle to said rod holding said blade, and said indicating finger is captured in an elongated slot formed adjacent to said plurality of exit openings in said first of said opposed ends.

* * * * *